United States Patent
Mansour et al.

(10) Patent No.: US 9,137,683 B1
(45) Date of Patent: Sep. 15, 2015

(54) WIRELESS NETWORK AIR-INTERFACE LOADING SIMULATOR

(71) Applicant: Sprint Spectrum LP, Overland Park, KS (US)

(72) Inventors: Nagi Mansour, Arlington, VA (US); Emerino J. Marchetti, Clifton, VA (US); Nawara Omary, Vienna, VA (US); Kafi Hassan, Fairfax, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 162 days.

(21) Appl. No.: 13/889,558

(22) Filed: May 8, 2013

(51) Int. Cl.
*H04W 24/00* (2009.01)

(52) U.S. Cl.
CPC ..................... *H04W 24/00* (2013.01)

(58) Field of Classification Search
CPC . H04W 24/02; H04W 24/04; H04W 36/0016; H04W 24/08; H04W 24/10; H04W 72/042; H04W 36/0055; H04W 36/0083; H04W 36/30; H04W 52/243; H04W 36/14; H04W 52/242; H04W 72/04; H04W 36/0061
USPC ........................... 455/424, 436, 525; 375/316
See application file for complete search history.

(56) References Cited

U.S. PATENT DOCUMENTS

| | | | | |
|---|---|---|---|---|
| 5,487,174 | A * | 1/1996 | Persson | 455/444 |
| 5,542,097 | A * | 7/1996 | Ward et al. | 455/437 |
| 5,854,981 | A * | 12/1998 | Wallstedt et al. | 455/439 |
| 6,456,652 | B1 * | 9/2002 | Kim et al. | 375/224 |
| 6,708,036 | B2 * | 3/2004 | Proctor et al. | 455/446 |
| 7,848,282 | B2 * | 12/2010 | Padovani et al. | 370/329 |
| 8,244,174 | B1 * | 8/2012 | Kong | 455/25 |
| 2004/0203418 | A1 * | 10/2004 | Ang et al. | 455/67.11 |
| 2006/0211427 | A1 * | 9/2006 | Azman et al. | 455/450 |
| 2007/0211827 | A1 | 9/2007 | Baggen et al. | |
| 2012/0115541 | A1 * | 5/2012 | Suga | 455/525 |
| 2013/0143566 | A1 * | 6/2013 | Kubota et al. | 455/436 |
| 2014/0064133 | A1 * | 3/2014 | Kazmi et al. | 370/252 |
| 2014/0213255 | A1 * | 7/2014 | Muller et al. | 455/436 |

* cited by examiner

*Primary Examiner* — Kashif Siddiqui
*Assistant Examiner* — Minjung Kim

(57) ABSTRACT

A first cell is selected as a center cell for testing. Downlink transmissions from a one or more surrounding cells are loaded with test load levels. The downlink transmissions, when loaded with test load levels, include a selected amount (s) of the data portions of their transmission frames carrying orthogonal channel noise (OCN). A performance indicator of the center cell is measured/determined while the surrounding cell(s) are transmitting test load levels and while the center cell is communicating user traffic between the center cell and a first plurality of wireless devices. The test load levels of the surrounding cells may also include user traffic in addition to the OCN.

18 Claims, 5 Drawing Sheets

WIRELESS NETWORK AIR-INTERFACE LOADING SIMULATOR

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known as long term evolution (LTE). Additional standards such as the fourth generation communication system (4G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, carrier modulation, frequency bands of operation, and message formats.

To check the capabilities, such as capacity and performance of deployed wireless networks, system testing may be performed. System testing can help discover real-world system problems and performance information such as configuration issues, interference sources (both inter-network and intra-network), radiation pattern issues/holes, cell/sector geographical boundaries, throughput by geography, handoff problems, etc.

OVERVIEW

In an embodiment, a method of testing a wireless communication system may include selecting a first cell as a center cell for testing. Downlink transmissions from a first surrounding tier of cells are loaded with a first selected test loading level. These downlink transmissions from the first surrounding tier of cells include transmission frames. The downlink transmissions, when loaded at the first selected test loading level, include a first selected amount of the data portions of the transmission frames configured to carry orthogonal channel noise (OCN). While the first surrounding cell is transmitting at the first test loading level, and while the center cell is communicating user traffic between the center cell and a first plurality of wireless devices, a performance indicator of the center cell is determined or measured. In an embodiment, to reflect real-life network conditions, two tiers of cells carrying orthogonal channel noise (OCN) surround the cell under test.

In an embodiment, a wireless communication system may comprise a center cell and a plurality of surrounding cells. The wireless communication system is configured to measure a performance indicator of the center cell while the center cell is communicating with a first plurality of wireless devices. The plurality of surrounding cells are configured to transmit orthogonal channel noise (OCN) in selected amounts of user data slots while the performance indicator of the center cell is measured.

In an embodiment, a method of operating a wireless communication system includes configuring the wireless communication system to measure a performance indicator of a center cell while the center cell is communicating with a first plurality of wireless devices. A plurality of surrounding cells are configured to transmit orthogonal channel noise (OCN) in selected amounts of user data slots while the performance indicator associated with the center cell is measured.

DETAILED DESCRIPTION

In an embodiment, the capabilities (i.e., performance parameters) of a wireless communication system are measured. These performance parameters in the downlink may include throughput, a reference signal received power (RSRP), signal-to noise ratio (SNR), reference signal received quality (RSRQ), etc. at various locations in or around a sector or cell. To determine what effect the loading on surrounding cells has on the performance/capacity of a center cell, the subframes transmitted by surrounding cells are loaded with an orthogonal channel noise source (OCNS). The center cell is configured to carry normal traffic during testing.

The amount of loading (i.e., percentage of air-interface resources carrying traffic or orthogonal channel noise (OCN) may be varied. This allows the effects on center cell performance versus traffic levels transmitted by the surround cells to be measured or estimated. The measurements or estimations may be used to improve the performance of the wireless network.

Figure 1:
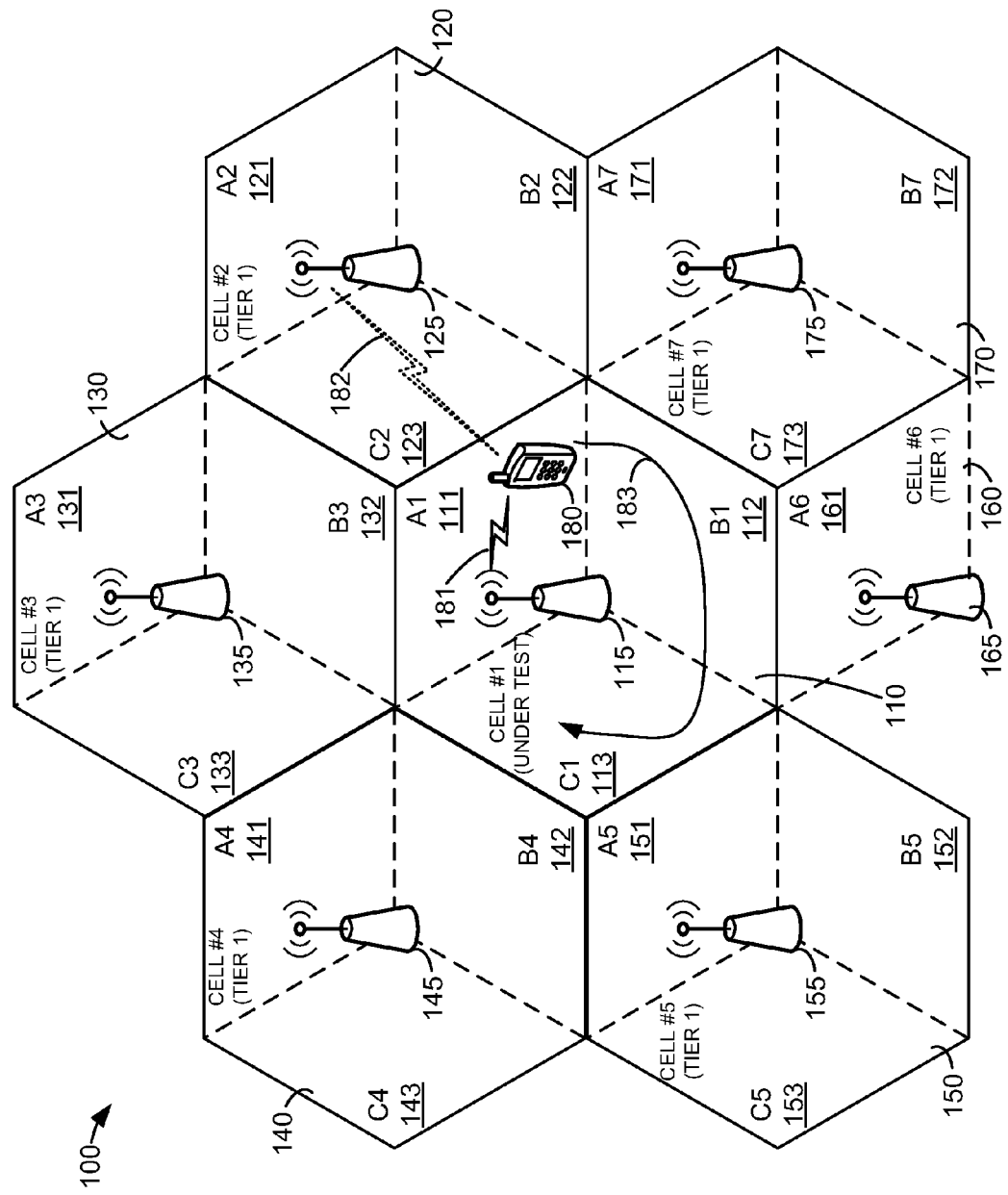
FIG. 1 is illustrates an arrangement of a group of wireless base stations, coverage areas, and performance testing.

FIG. 1 is illustrates an arrangement of a group of wireless base stations, coverage areas, and performance testing. In FIG. 1, communication system 100 comprises service area 110, service area 120, service area 130, service area 140, service area 150, service area 160, service area 170, base station 115, base station 125, base station 135, base station 145, base station 155, base station 165, base station 175, and wireless device 180. Base stations 115, 125, 135, 145, 155, 165, and 175 may also be referred to as wireless stations. Wireless device 180 is operatively coupled to base station 115 via wireless link 180.

In FIG. 1, service area 110 includes three sectors A1 111, B1 112, and C1 113. Service area 120 includes three sectors A2 121, B2 122, and C2 123. Service area 130 includes three sectors A3 131, B3 132, and C3 133. Service area 140 includes three sectors A4 141, B4 142, and C4 143. Service area 150 includes three sectors A5 151, B5 152, and C2 153. Service area 160 includes three sectors A6 161, and two sectors not shown in FIG. 1. Service area 170 includes three sectors A7 171, B7 172, and C7 173. Wireless device 180 is shown in sector A1 111 of service area 110.

In FIG. 1, service areas 110, 120, 130, 140, 150, 160, and 170 are shown as hexagons. Each sector 111-113, 121-123, 131-133, 141-143, 151-153, 161, 171-173, of service areas 110-170, respectively, occupies one-third of a hexagon. The sectors in FIG. 1 are shown with the "A" sectors 111, 121, 131, 141, 151, 161, and 171 in the upper right one-third of the service areas 110-170, respectively. The "B" sectors 112, 122, 132, 142, 152, and 172 are shown in the lower right one-third of service areas 110-170, respectively. The "C" sectors 113, 123, 133, 143, 153, and 173 are shown in the left one-third of service areas 110-170, respectively. Also in FIG. 1, at least the following sectors are adjacent and share a common boundary: A1 111 and C2 123; A1 111 and B3 132; C1 113 and B4 142; C1 113 and A5 151; B1 112 and A6 161; and, B1 112 and C7 173.

Service area 110 illustrates the area serviced by base station 115. Service area 120 illustrates the area serviced by base station 125. Service area 130 illustrates the area serviced by base station 135. Service area 140 illustrates the area serviced by base station 145. Service area 150 illustrates the area serviced by base station 155. Service area 160 illustrates the area serviced by base station 165. Service area 170 illustrates the area serviced by base station 175.

In LTE specified technology, for a 5 MHz system, there are 25 resource blocks (RBs) in each 1 ms subframe. Each subframe has 168 resource elements (REs). A resource element is the minimum allocation in the frequency and in the time domain.

Resource elements are allocations of frequency and time that base stations 115, 125, 135, 145, 155, 165, and 175 utilize to communicate with wireless devices. For example, in an LTE specified system, transmissions are divided into subframes. Subframes are allocations of transmission times. Each subframe is further divided into allocations of frequency and symbols. Symbols are an allocation of time that is less than a subframe. A minimum unit of frequency and time that may be allocated in a subframe of an LTE specified system may be referred to as a slot (84 REs in a 5 MHz system). Two 0.5 ms slots comprise a 1 ms subframe. In an LTE system, resource elements of a slot may be allocated to overhead functions such as reference signals and control signaling (e.g., DCCH—Dedicated Control CHannel and DL-SCH—DownLink Shared CHannel). The term "slot" may be applied to other wireless systems. In particular the term "slot" (meaning an allocation of frequency and time) may be used to describe the sub-channels of other systems that utilize orthogonal frequency-division multiple access (OFDMA).

Wireless device 180 may be any device, system, combination of devices, or other such communication platform capable of communicating a data stream with base station 115 via wireless link 181. Wireless device 180 may be, or comprise, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with base station 115 via wireless link 181. Other types of communication platforms are possible.

Base stations 115, 125, 135, 145, 155, 165, and 175 may be any wireless systems that provide air interfaces to wireless devices (e.g., wireless device 180). Examples of base stations that may be utilized include, base transceiver stations (BTSs), radio base stations (RBSs), Node B, enhanced Node B (eNBs) and others. Base stations may include a number of elements known to those skilled in the art comprising a transceiver, power amplifier, combiner, duplexer, antenna and control function.

Wireless link 181 uses the air, or space, as the transport media. Wireless link 181 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format.

In communication system 100, transmission by one or more of the base stations 125, 135, 145, 155, 165, and 175 that surround center base station 115 may interfere or otherwise affect the performance of base station 115's ability to communicate with wireless device 180. The ability of base station 115 to communicate with wireless device 180 may be affected by transmissions from one or more of base stations 125, 135, 145, 155, 165, and 175. This is illustrated in FIG. 1 by transmission 182. The ability of base station 115 to communicate with wireless device 180 may be shown by performance indicators associated with base station 115 measured in the service area 110.

Performance indicators associated with base station 115 may be determined or measured by wireless device 180 or other test equipment. Performance indicators associated with base station 115 may include, for example, the reference signal received power (RSRP), the signal-to-noise ratio (SNR) and the reference signal received quality (RSRQ) measured by wireless device 180. In another example, indicators of other factors, such as packet loss and/or packet error rate, between wireless device 180 and base station 115, may be determined or measured as indicator(s) of performance that are associated with base station 115. These factors, or other factors associated with wireless device 180 and/or base station 115 may be used to determine performance indicators.

In an embodiment, service area 110, sectors 111, 112, 113, and/or base station 115 may be selected for testing. To test the performance of service area 110, sector 111, and/or base station 115, it is preferable to load one or more of (or all of) the surrounding cells (i.e., service areas 120-170, sectors 111-173, and/or base stations 115-175). The surrounding cells may be loaded at varying levels (e.g., 25% loaded, 50% loaded, 100% loaded, etc.) in order to determine a loading effect on the center cell.

The downlink transmissions from at least one of base station 125-175 are loaded with a test loading level. This test loading level may be the same for all base stations 125-175. Alternatively, the test loading level of one or more of base stations 125-175 may be different from the test loading level of another one or more of base stations 125-175.

In order to load the downlink transmissions from a base station 125-175, the transmission subframes of the downlink transmissions are configured such that a selected number (or percentage) of resource elements carry orthogonal channel noise (OCN). This orthogonal channel noise may be generated by an orthogonal channel noise source (OCNS). Thus, the loaded transmission subframes transmitted by base stations 125-175 have known noise signals power in their data part.

The loading level of the transmission subframes may be defined as the selected number (or percentage) of resource elements having orthogonal channel noise (OCN). In an alternative, the loading level of the transmission subframes may be defined as a total number of resource elements in a subframe having either user traffic or OCN (as related to the total allocated power of the base station for the data part in the downlink). In other words, the loading level of the transmission subframes may be defined as just the number of OCN resource elements in a subframe (out of the total or total number of non-overhead slots available). Note that 100% loading may correspond to 100% OCN/data occupancy of resource elements in a 1 ms subframe that corresponds to the total Base station power minus the power allocated to overhead. Alternatively, the loading level may be defined as the total number of resource elements in a subframe carrying a signal (which is either user traffic or OCN) such that the number of resource elements carrying OCN varies with the number of resource elements carrying user traffic in order to keep the number of signal carrying resource elements constant from transmission subframe to transmission subframe. In other words level of loading is related to the fraction of power allocated to OCN/data as related to the total Base Station power that corresponds normally to the Base Station data part.

While one or more (or all) of the surrounding base stations 125-175 are transmitting at the selected test loading level, the center base station 115 is communicating normal user traffic with the wireless device(s) 180 that base station 115 is serving. Wireless device 180 and/or base station 115 then determine one or more performance indicators of the center cell while the one or more (or all) of the surrounding base stations 125-175 are transmitting at the selected test loading level and the center base station 115 is communicating normal user traffic with the wireless devices it is serving.

The measured performance indicators may include for example in the downlink RSRP, SNR, RSRQ, packet loss, packet error rate, throughput, etc. The measured performance indicators may be based on traffic communicated between base station 115 and wireless device 180 on the uplink and/or downlink.

In an embodiment, wireless device 180 is moved around service area 110 in order to make measurements of performance indicators at different locations around service area 110, and/or sectors 111-113. This is illustrated in FIG. 1 by arrow 183.

Figure 2:
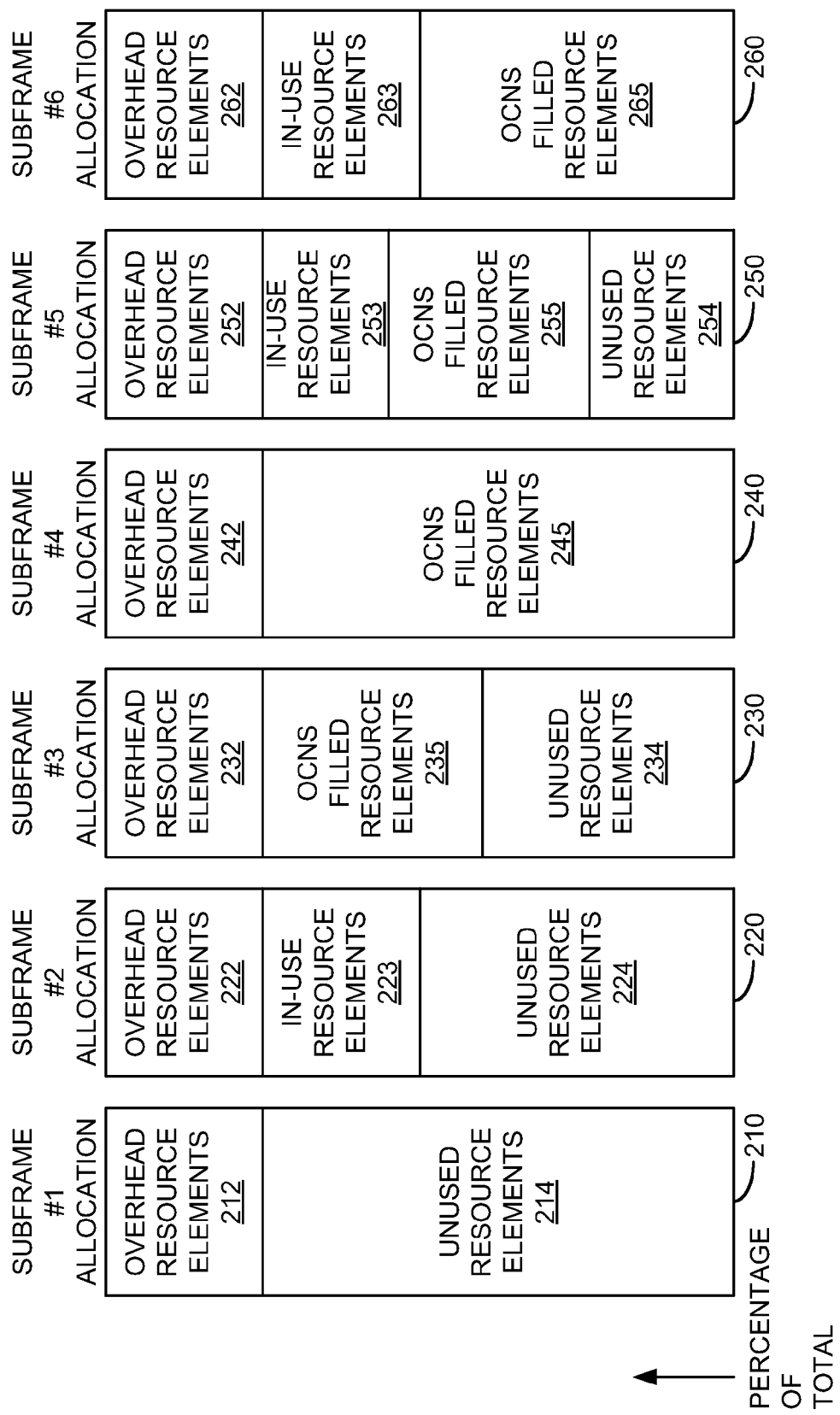
FIG. 2 is an illustration of various per subframe air-interface resource allocations.

FIG. 2 is an illustration of various per subframe air-interface resource allocations. The air-interface resource allocations illustrated in FIG. 2 may be transmitted by one or more elements of communication system 100 while performance indicators associated with coverage area 110, sector 111, and/or base station 115 are measured, tested, and/or determined.

In FIG. 2, example subframe allocation #1 210 consists of overhead resource elements 212 and unused resource elements 214. Subframe allocation #1 210 may correspond to a loading level of 0%. Example subframe allocation #2 220 consists of overhead resource element 222, in-use resource elements 223, and unused resource elements 224. Subframe allocation #2 may correspond to a normal operating subframe allocation. In other word, subframe allocation #2 includes resource elements 222 and 223 necessary for handling traffic, but does not include resource elements filled with OCN.

Example subframe allocation #3 230 consists of overhead resource elements 232, OCNS filled resource elements 235, and unused resource elements 234. Subframe allocation #3 may correspond to a test loading level when a base station 125-175 is not carrying any user traffic. Example subframe allocation #4 240 consists of overhead resource elements 242 and OCNS filled resource elements 245. Subframe allocation #4 may correspond to a test load level of 100% when a base station 125-175 is not carrying any user traffic and at full power.

Example subframe allocation #5 250 consists of overhead resource elements 252, in-use resource elements 253, OCNS filled resource elements 255, and unused resource elements 254. Example subframe allocation #5 may correspond to a non-100% load level or partial load level when a base station 125-175 is carrying user traffic. The amount of resource elements occupied by in-use resource elements 253 may vary over time (i.e., from subframe-to-subframe). The amount of resource elements occupied by OCNS filled resource elements 255 may be configured to remain constant as the amount of resource elements occupied by in-use resource elements 253 varies over time. The amount of resource elements occupied by OCNS filled resource elements 255 may be configured to vary with the amount of resource elements occupied by in-use resource elements 253 such that the total of in-use resource elements 253 and OCNS filled resource elements 255 remains a constant over time (for example, out of the total of 168 REs in 1 ms subframe). Example subframe allocation #6 260 consists of overhead resource elements 262, in-user resource elements 263, and OCNS filled resource elements 265. Subframe allocation #6 may correspond to a test load level of 100% when a base station 125-175 is carrying user traffic.

Figure 3:
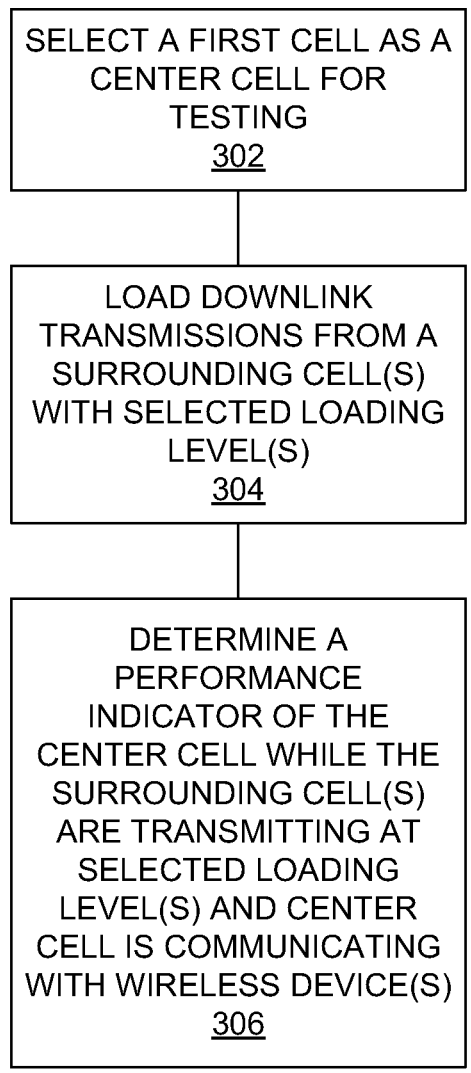
FIG. 3 is a flowchart illustrating a method of testing a wireless communication system.

FIG. 3 is a flowchart illustrating a method of testing a wireless communication system. The steps illustrated in FIG. 3 may be performed by one or more elements of communication system 100. A first cell is selected as a center cell for testing (302). For example, the coverage area 110 associated with base station 115 may be selected for testing. In another example, the coverage area of sector A1 111 may be selected for testing.

Downlink transmissions from surrounding cell(s) are loaded with a selected loading level (304). For example, downlink transmissions by base stations 125-175 may be loaded with one or more selected loading levels. Normally all surrounding base stations 125-175 will be loaded with a selected loading level (e.g., 50%, 60%, up to 100%. The 100% will correspond to full RE occupancy at full base station power.) These loading levels may be the same for all of base stations 125-175, or may be varied among base stations 125-175. In another example, downlink transmissions by sectors B1 112, C1 113, B3 132, and/or C2 123 may be loaded with one or more selected loading levels. These loading levels may be the same for all of sectors B1 112, C1 113, B3 132, and/or C2 123, or may be varied among sectors B1 112, C1 113, B3 132, and/or C2 123.

A performance indicator of the center cell is determined while the surrounding cell(s) are transmitting at selected loading level(s) and the center cell is communicating with wireless device(s) (306). For example, wireless device 180 and/or base station 115 (and/or other test equipment, not shown in FIG. 1) may determine a performance indicator associated with service area 110 (and/or base station 115 and/or sector 111) while one or more of base stations 125-175 are transmitting at a respective selected loading level. The selected loading level may comprise user traffic and OCN filled resource elements (usually OCN). In an embodiment, the performance indicator of the center cell may be determined while the center cell is at a center cell test loading level. The center cell may be loaded with a test loading level that includes a selected amount of data portions of the center cell transmission subframes carrying OCN.

Figure 4:
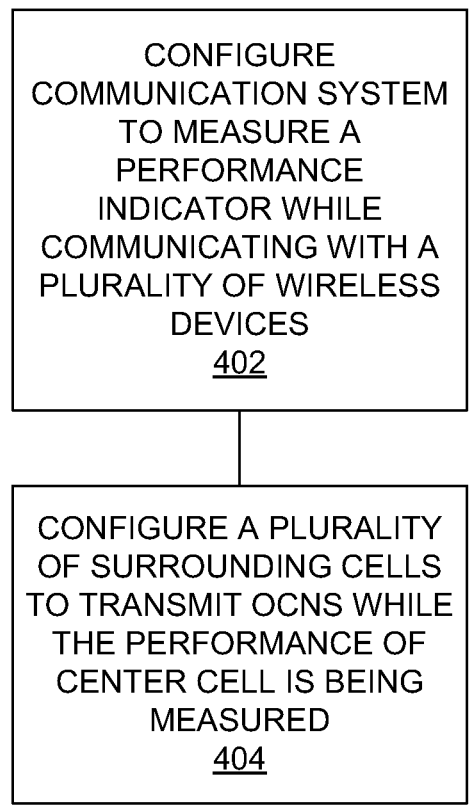
FIG. 4 is a flowchart illustrating a method of operating a wireless communication system.

FIG. 4 is a flowchart illustrating a method of operating a wireless communication system. The steps illustrated in FIG. 4 may be performed by one or more elements of communication system 100. A communication system is configured to measure a performance indicator while communicating with a plurality of wireless devices (402). For example, base station 115 may be configured to measure a performance indicator while base station 115 is communicating with one or more wireless devices 180. In another example, wireless device 180 and/or other test equipment may be configured to measure a performance indicator associated with coverage area 110 (and/or base station 115 and/or sector 111) while base station 115 is communicating with one or more wireless devices 180.

A plurality of surrounding cells are configured to transmit OCN while the performance of the center cell is being measured (404). For example, one or more of base stations 125-175 and/or sectors B1 112, C1 113, B3 132, and/or C2 123 may be loaded with one or more selected loading levels. These selected loading levels may include resource elements that are filled with OCN. While subframes with these selected loading levels are being transmitted by one or more of base stations 125-175 and/or sectors B1 112, C1 113, B3 132, and/or C2 123, base station 115, wireless device 180 and/or other test equipment may be configured to measure a performance indicator associated with service area 110 (and/or base station 115 and/or sector 111).

The methods, systems, devices, networks, base station, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: wireless device 180 and/or base stations 115-175.

Figure 5:
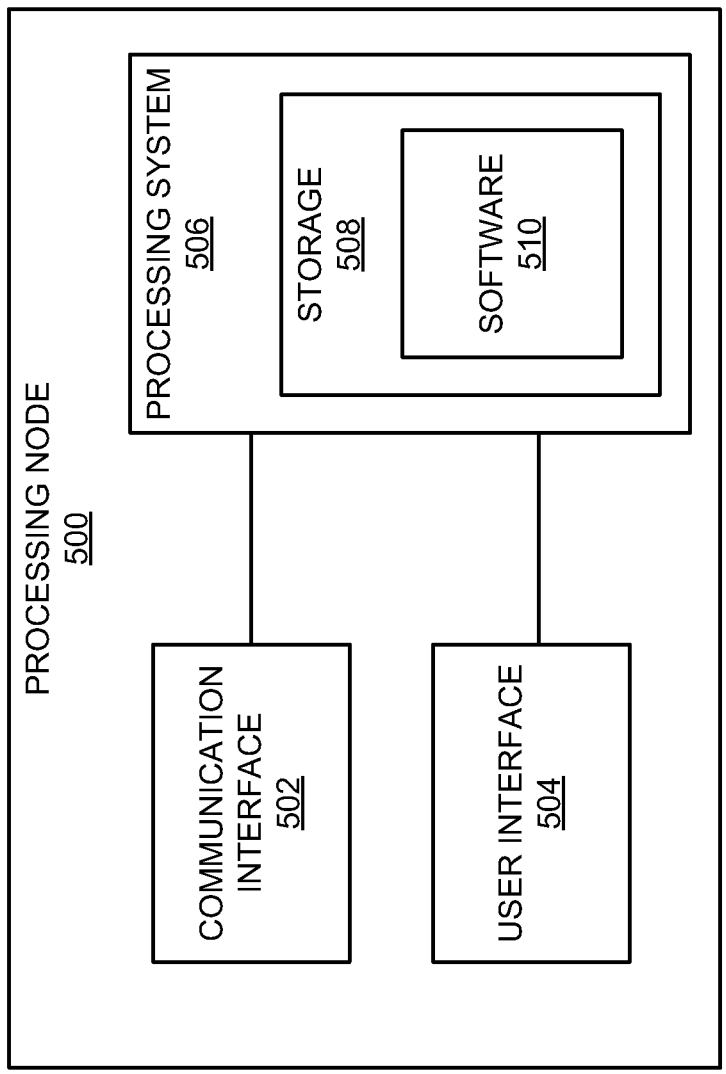
FIG. 5 illustrates a processing node.

FIG. 5 illustrates an exemplary processing node 500 comprising communication interface 502, user interface 504, and processing system 506 in communication with communication interface 502 and user interface 504. Processing node 500 is capable of paging a wireless device. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of testing a wireless communication system, comprising:
    selecting a first cell as a center cell for testing;
    loading downlink transmissions from a plurality of surrounding cells with different selected test loading levels, wherein subframes of the downlink transmissions are configured such that, when loaded at the selected test loading level, selected amount of data portions of the subframes carry orthogonal channel noise (OCN); and,
    selecting a live wireless device that is moving within a coverage area of the center cell to measure a performance indicator associated with the center cell at different locations,
    wherein each of the plurality of surrounding cells is transmitting at the selected test loading level while the selected wireless device measures the performance indicator and the center cell communicates with a first plurality of live wireless devices located in the coverage area of the center cell.

2. The method of claim 1, wherein the performance indicator is based on downlink traffic communicated between the center cell and at least one of the first plurality of live wireless devices.

3. The method of claim 1, wherein the performance indicator is based on uplink traffic communicated between the center cell and at least one of the first plurality of live wireless devices.

4. The method of claim 1, wherein the performance indicator associated with the center cell is determined while the center cell is at a center cell test loading level that includes center cell selected amount of data portions carrying OCN.

5. The method of claim 1, wherein at least one surrounding cell of the plurality of surrounding cells communicates user traffic between the at least one surrounding cell and a second plurality of live wireless devices.

6. A wireless communication system, comprising:
    a center cell, the wireless communication system configured to measure a performance indicator of the center cell via a selected wireless device while the center cell is communicating with a first plurality of live wireless devices, wherein the selected wireless device is a live wireless device; and,
    a plurality of surrounding cells, the plurality of surrounding cells configured to transmit orthogonal channel noise (OCN) in selected amounts of user data slots while the performance indicator of the center cell is measured, wherein each of the plurality of surrounding cells is loaded with different selected test loading levels.

7. The wireless communication system of claim 6, wherein the performance indicator is based on downlink traffic communicated between the center cell and one of the first plurality of live wireless devices.

8. The wireless communication system of claim 6, wherein the performance indicator is based on uplink traffic communicated between the center cell and one of the first plurality of live wireless devices.

9. The wireless communication system of claim 6, wherein the selected amounts of user data slots are substantially the same for each of the plurality of surrounding cells.

10. The wireless communication system of claim 6, wherein at least one of the plurality of surrounding cells is configured to communicate with a second plurality of live wireless devices while the center cell is measuring the performance indicator.

11. The wireless communication system of claim 10, wherein at least one of the plurality of surrounding cells is configured to communicate non-test traffic with the second plurality of live wireless devices while the wireless communication system is measuring the performance indicator.

12. The wireless communication system of claim 11, wherein, while the wireless communication system is measuring the performance indicator, the plurality of surrounding cells are configured to transmit at the selected test loading level, the selected test loading level including the non-test traffic communicated with the second plurality of live wireless devices and a varying amount of OCN in user data slots, the varying amount of OCN in user data slots determined by an amount of slots occupied by the non-test traffic being communicated with the second plurality of live wireless devices.

13. A method of operating a wireless communication system, comprising:
    configuring the wireless communication system to measure a performance indicator of a center cell via a selected wireless device while the center cell is communicating with a first plurality of live wireless devices; and,
    configuring a plurality of surrounding cells to transmit orthogonal channel noise (OCN) in selected amounts of user data slots while the performance indicator associated with the center cell is measured, wherein each of the plurality of surrounding cells is loaded with different selected test loading levels.

14. The method of claim 13, wherein the performance indicator is based on downlink traffic communicated between the center cell and one of the first plurality of live wireless devices.

15. The method of claim 13, wherein the performance indicator is based on uplink traffic communicated between the center cell and one of the first plurality of live wireless devices.

16. The method of claim 13, wherein the selected amounts of user data slots carrying the OCN is configured to be substantially the same for each of the plurality of surrounding cells.

17. The method of claim 13, wherein at least one of the plurality of surrounding cells is configured to communicate with a second plurality of live wireless device while the wireless communication system is measuring the performance indicator.

18. The method of claim 17, wherein, the plurality of surrounding cells are configured to transmit at the selected test loading level while the wireless communication system is measuring the performance indicator, the selected test loading level including the non-test traffic communicated with the second plurality of live wireless devices and a varying amount of OCN in user data slots, the varying amount of OCN in user data slots determined by an amount of slots occupied by the non-test traffic being communicated with the second plurality of live wireless devices.

\* \* \* \* \*